United States Patent [19]

Jones

[11] 4,174,792

[45] Nov. 20, 1979

[54] DISPENSING APPARATUS FOR A VEHICLE HAVING CLOSURE GATE CLEARING MEMBER

[76] Inventor: Eldon D. Jones, R.R. 2, Lake Crystal, Minn. 56055

[21] Appl. No.: 899,121

[22] Filed: Apr. 24, 1978

[51] Int. Cl.² ............................................. A01C 15/06
[52] U.S. Cl. .................................... 222/608; 222/547
[58] Field of Search ............... 222/608, 557, 564, 556, 222/545, 483, 485, 270, 547, 614; 105/247–253

[56] References Cited

U.S. PATENT DOCUMENTS

| | | | |
|---|---|---|---|
| 1,751,565 | 3/1930 | Talbott | 222/608 X |
| 3,194,454 | 7/1965 | Cox | 222/557 X |
| 3,716,172 | 2/1973 | Crippen | 222/547 X |

*Primary Examiner*—Stanley H. Tollberg
*Attorney, Agent, or Firm*—Geoffrey R. Myers; William D. Hall

[57] ABSTRACT

Provided is a vehicle for hauling and dispensing grain of the type which includes a grain body and underbelly dispensing gates in the body. Each underbelly dispensing gate rotates about its own central shaft actuated by a detented lever mechanism. The portion of the gate which must move upward to open the gate and initiate dispensing is overshadowed by a convex member which provides a cavity vacant of grain thereby allowing the gate to be opened even when the body is filled with grain.

9 Claims, 5 Drawing Figures

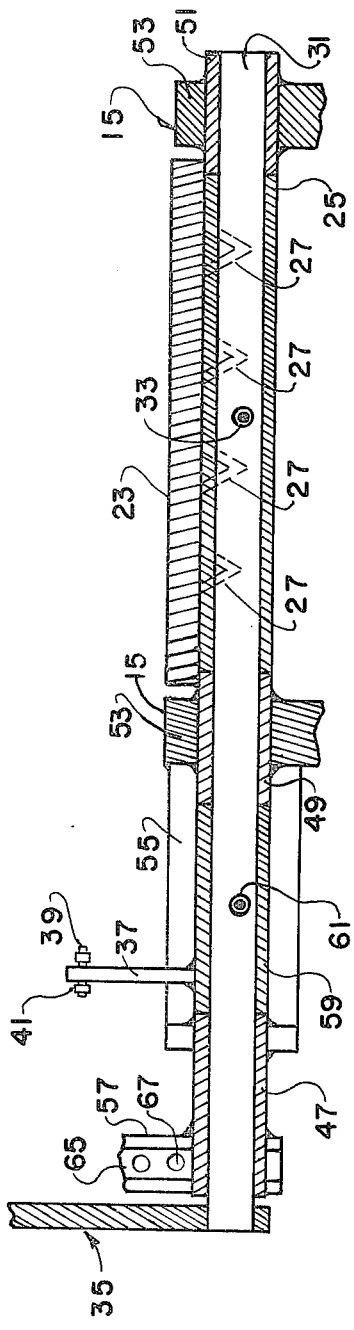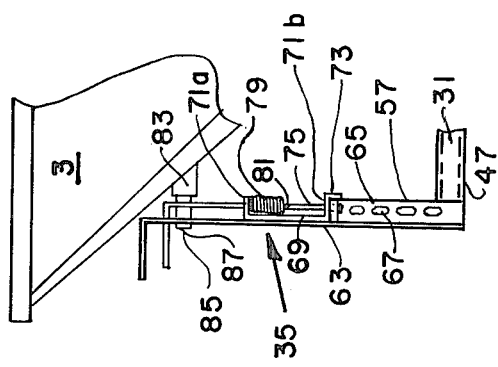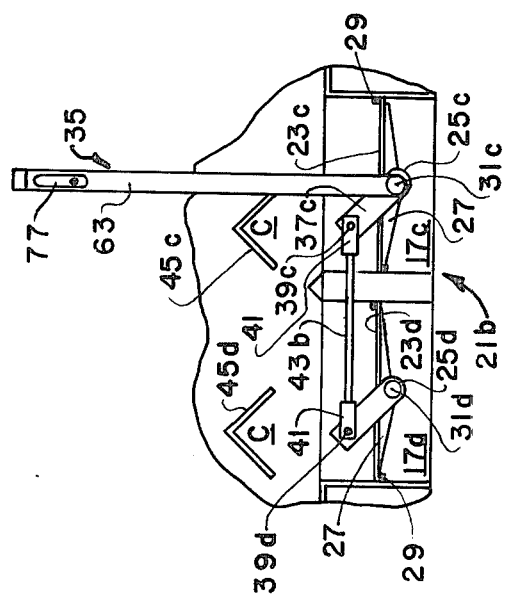

DISPENSING APPARATUS FOR A VEHICLE HAVING CLOSURE GATE CLEARING MEMBER

This invention relates to vehicles for hauling and dispensing granular or particulate material such as grain, corn, other farm products, crushed stone and the like. More particularly, this invention relates to certain unique improvements and in the apparatus for dispensing such material from underbelly gates provided in such vehicles.

Various types of vehicles have been used to haul material such as wheat, corn, and other grains from the fields to the storage facilities. One of the most popular of these types has been the so-called grain wagon comprised of a large grain body or hopper, a laterally extending axle assembly located fore and aft along the frame structure of the hopper and a dispensing apparatus located in the central underbelly of the body. Often the sides of the body are made to slant toward the dispensing apparatus to better facilitate dispensing.

The dispensing apparatus heretofore popularly employed generally included a sliding door or series of narrow, connected sliding doors. This type of apparatus has characteristically caused a problem because such doors tend to bind, stick, or rust in place. At best, therefore, such prior apparatus offered a considerable amount of friction which opposed easy and reliable dispensing.

It is apparent from the above that there exists a need in the art for an improvement in the dispensing mechanism of such vehicles which overcomes or at least mitigates the aforesaid problems. It is the purpose of this invention to fulfill this and other needs which will become apparent to the skilled artisan once given the following disclosure:

Generally speaking this invention fulfills these needs by providing in a vehicle for hauling and dispensing a particulate material including a body portion for holding the particulate material and a means of elevating the body portion above ground level, the body portion including a floor, walls extending upwardly from said floor, a dispensing orifice in the floor and a dispensing means located in the orifice for selectively opening and closing the orifice thereby to allow or prevent flow of the particulate material from the body portion, the improvement comprising, as the dispensing means, a dispensing gate extending across the orifice, means for rotating the gate about a point intermediate its ends, one of the ends of the gate thereby being rotated upwardly and the other of the ends being rotated downwardly for selectively opening the orifice to allow dispensing of the particulate material from the body, and means located above the upwardly rotated end for allowing the upwardly rotated end to rotate despite the presence of the particulate material on the gate.

In certain preferred embodiments of this invention, the means for allowing the upwardly rotated end to rotate despite the presence of the particulate material on the gate, comprises a means for forming a vacant cavity above the upwardly rotated end, such that when the upwardly rotated end is in its closed position, no particulate matter exists in the cavity, the cavity being sufficiently large to allow sufficient upward rotation of the upwardly rotated end to initiate dispensing of the material through the orifice.

In other preferred embodiments the means for rotating the gate includes a shaft means extending laterally of the vehicle, handle means connected to the shaft means for rotating the shaft and means associated with the handle means for limiting the degree of rotation of the shaft.

This invention will now be described with respect to certain embodiments illustrated in the accompanying drawings, wherein:

IN THE DRAWINGS

FIG. 3 is a partial, plan side cut-away view of the dispensing mechanism illustrated in FIG. 1.

FIG. 4 is a rear sectional view of the shafting of FIG. 3.

FIG. 5 is a partial rear plan view of the handle mechanism of FIG. 1.

Figure 1:
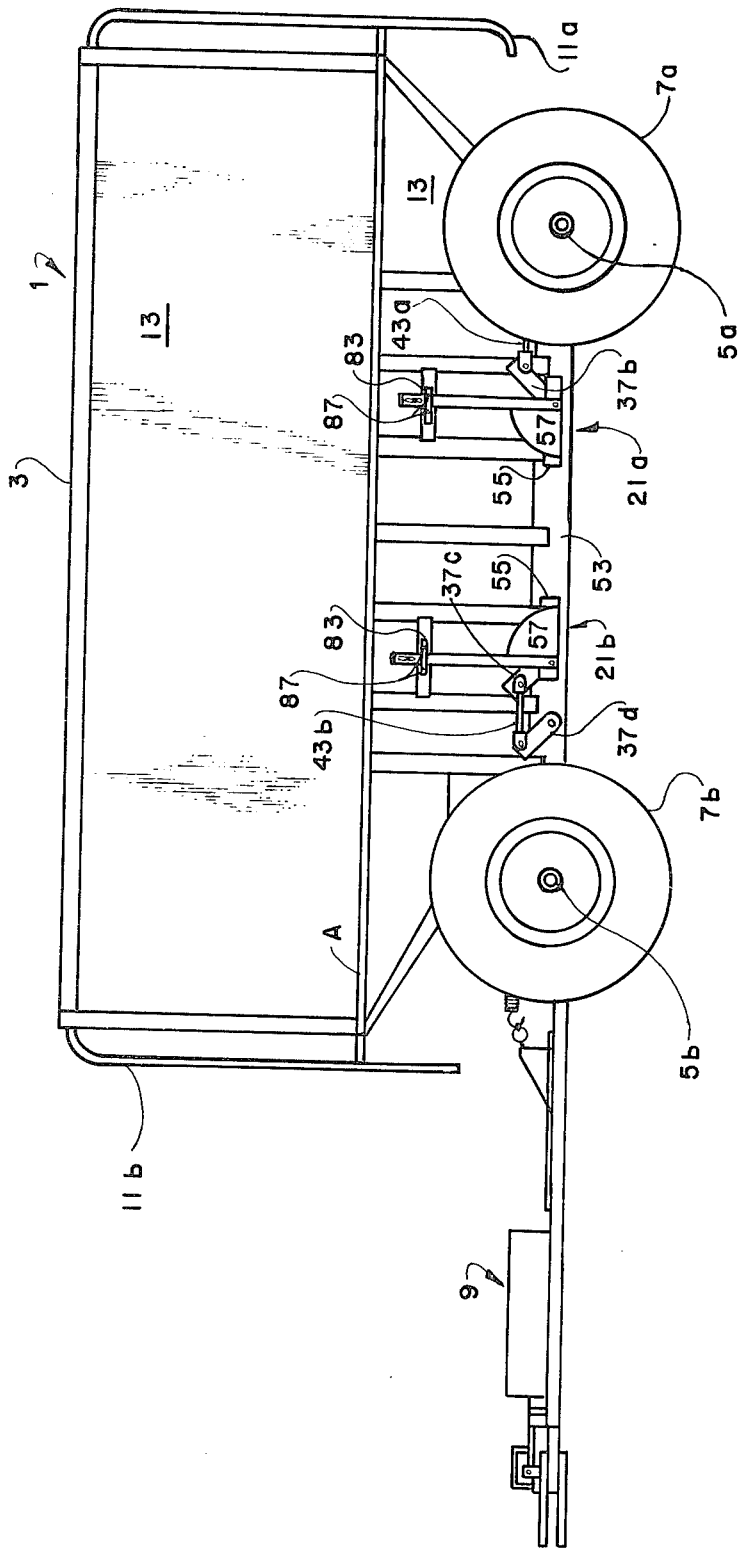
FIG. 1 is a side plan view of an embodiment of this invention.
Figure 2:
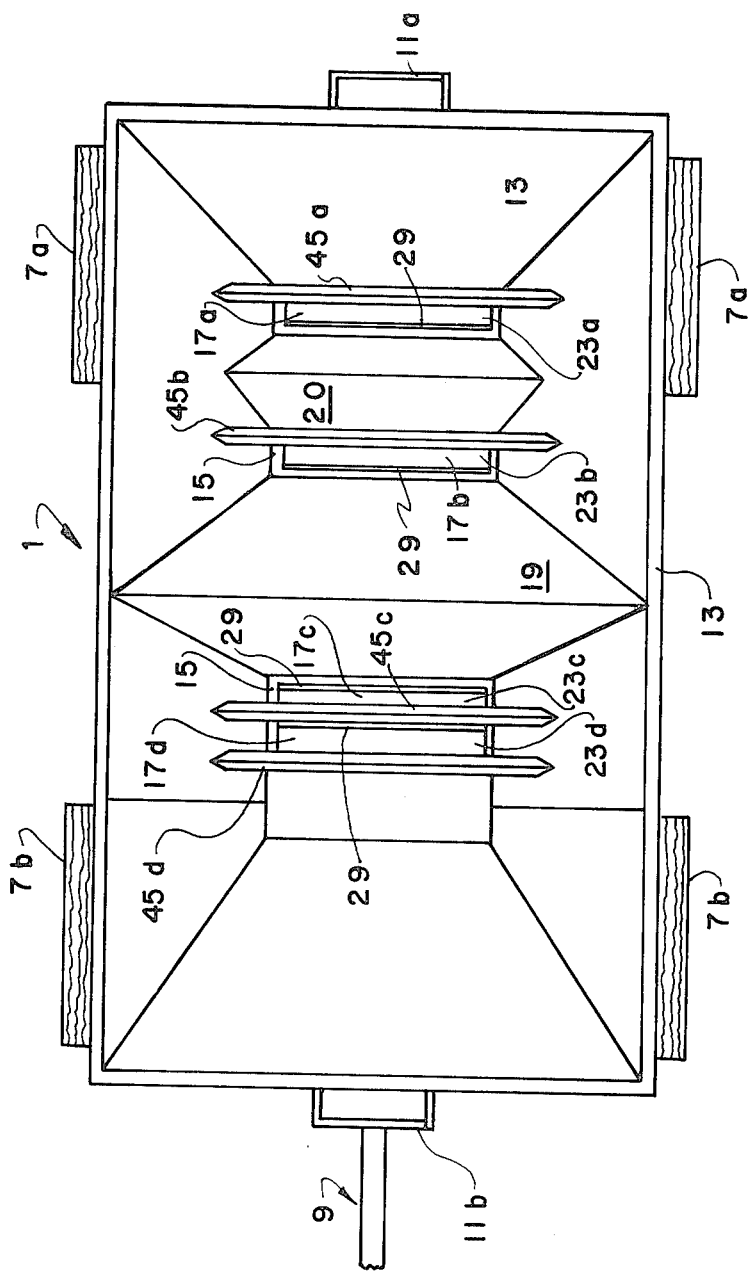
FIG. 2 is a partial, top plan view of the embodiment of FIG. 1.

With reference to the drawings, and initially to FIGS. 1-2, there is illustrated a grain wagon 1 comprised of grain body 3, two axles 5a,b and two pairs of wheels 7a,b. A towing mechanism 9 is provided at the forward end of wagon 1 while ladders 11a,b are provided at either end for access to the inside of body 3.

Wagon body 3 is formed of side walls 13 which converge toward each other and terminate in floor portion 15. Floor 15 is provided with dispensing orifices 17a,b,c, and d. In the embodiment of wagon 1 illustrated in the drawings, body 3 is split by separate wall 19 into 2 compartments, each having a pair of dispensing orifices 17. Wall 19 need not extend to the top of walls 13, but need only extend to the point at which walls 13 begin to converge (herein at point A).

It is understood that many other body configurations may be employed. For example, there may only be one orifice 17 or a plurality other than 4. Body 3 may only be of a single compartment or may be multicompartmented either for ease of dispensing or for hauling more than one type of particulate material. In this latter situation wall 19 may be of the same height as walls 13 to insure separation at full load. In large compartments, such as the rearward compartment of FIG. 2, a low separation wall 20 may be provided to facilitate dispensing.

As further illustrated in FIGS. 1-2 the four dispensing orifices 17a,b,c, and d are segregated in two pairs of orifices, one pair being located in each compartment. Each orifice pair is controlled by a common dispensing mechanism generally illustrated as 21a and 21b, respectively.

FIG. 3 illustrates the various parts of mechanism 21b, in cut-away view. Mechanism 21a is the same as 21b. Mechanism 21b in this respect, is comprised of a pair of orifice plates 23c, d which extend across and close off their respective orifices 17c,d. Mechanism 21a is likewise provided with plates 23a,b. Plates 23 are attached intermediate their ends to their respective bearing shafts 25a,b,c, and d. Each plate 23 is reinforced with a plurality of longitudinal members 27. Stop means 29 are provided at either ends of the plates 23 to prevent rotation of the plates beyond their intended limits.

As will be discussed more fully with respect to FIG. 4, bearing shafts 25 are connected to central shafts 31a,b,c,d, via pins 33 such that rotation of a shaft 31 rotates its respective bearing shaft 25 and rotates a dispensing plate 23 (see arrows in FIG. 3). This is accomplished by a single handle means 35 connected to one of each pair of shafts 31. Each shaft 31 of the pair is then connected to the other by upstanding pivot connections 37a,b,c, and d. At the upper ends of pivot connections 37, there are provided pivot pins 39 which are connected to clevis members 41, which in turn, are connected together by rods 43a,b. One clevis 41 and a respective end of each of rods 43a,b are provided with screw threads while the other ends are held stationary, such that the length between a respective pair of clevises 41 may be adjusted via its rod 43. In this way the tightness of the closure of plates 23 may be adjusted.

If the configuration were left here with no further structure, it would be difficult if not impossible to rotate plates 23 and thus, open the orifices for dispensing when wagon 1 was more than just minimally filled. This is because the weight of grain or other particulate matter in the amounts conventionally carried by these wagons places a large load on plates 23. In many instances handle means 35 even with its mechanical advantage could not readily open orifice 17 to the desired degree. For example, in the typical configuration, wagon 1 may be of 16½ ft. long 96 inches in width and 103 inches in height. As such it may carry about 600 bushels of grain. Extensions are conventionally added to the upper ends of the sides, often as much as 14 or more inches in height. The capacity is thereby increased to 725 bushels or more, and the weight and bulk pressing on the upper surfaces of plates 23 are quite considerable.

To eliminate, or at least mitigate this problem, and thus, allow plates 23 to be rotated to the desired degree for dispensing purposes, there is provided above plates 23, "V"-shaped plate members 45a,b,c, and d. As best illustrated in FIGS. 2 and 3, a plate member 45 is located over the end of plate 23 which will rotate upwardly to initiate opening of its orifice 17. It is believed that the upside-down "V" of plate 45 forms a cavity "C", vacant of grain within its confines and thus, allows plate 23 to be rotated despite the fact that some grain may exist across the entire top of plate 23. In this respect, it has been found advantageous to provide plate 45 immediately above plate 23 with just enough clearance between the bottom of the legs of the "V" and the end of plate 23 to allow plate 23 to be rotated there past. It has also been found advantageous to locate shaft 25 in the middle of plate 23 and to have plate 45 extend over the one-half of plate 23 which will rotate upwardly during opening, the vortex of the "V" being located above the middle of this one-half of plate 23 as illustrated in FIG. 3. In this way, dispensing is easily accomplished despite a full load in wagon 1.

The shafting technique typically employed in the practice of this invention is best illustrated in FIG. 4 which is generically numbered with respect to all four mechanisms. As illustrated, shaft 31 is the main shaft for the system. Shaft 31 is connected at one end to handle means 35 and is held in place by bearings 47,49, and 51. Bearings 47, 49, and 51 are hollow shafts of slightly greater diameter than shaft 31 thereby to allow shaft 31 to rotate therewithin. The contacting surfaces may be lubricated if desired. Bearings 49 and 51 are connected to structural members 53 of body 3. Bearing 47 is held in place by bracket 55 which in turn is connected to a member 53. At the outboard end of bearing 47, adjacent handle means 35 is provided metering plate 57 which, being connected to stationary bearing 47 does not rotate with shaft 31. On those shafts 31 (i.e. 31a and 31d) which do not have handle means 35, bearing 47, bracket 55 and metering plate 57 need not be employed.

Bearing shaft 59 is located between bearings 47 and 49 and is rigidly connected to shaft 31 by pin 61 such that rotation of shaft 31 rotates bearing shaft 59. Located on the outside surface of shaft 59 is upstanding pivot connection 37.

Bearing shaft 25 is located between bearings 49 and 51 and similarly pinned (via pin 33) to shaft 31. As described above plate 23 is attached to shaft 25 and thus, rotated when shaft 31 is rotated by handle means 35.

Handle means 35 is best illustrated in FIG. 5. As shown, it includes a handle 63 extending radially from and attached to the end of shaft 31. Adjacent handle 63 is metering plate 57 having a horizontal surface provided with a plurality of holes 67 therein. Plate 57 is preferably a hollow structure of two side walls and surface 65 as illustrated in FIG. 4.

Located immediately adjacent surface 65 and connected to the inboard surface of handle 63 is flange member 69. Flange member 69 comprises a vertical web connecting two horizontal legs 71a,b. Leg 71b has a small vertical plate 73 extending downwardly therefrom adjacent the inboard surface of member 65. Legs 71a and 71b are provided with aligned holes through which extend stop rod 75. The diameter of the lower end of stop rod 75 is smaller than holes 67 in surface 65. The upper end of rod 75 is bent at an angle and extends through slot 77 in handle 63. The upper portions of handle 63 and rod 75 thereby extend horizontally outboard of the vehicle and parallel to each other. These horizontal portions are, additionally, spaced only a small distance from each other such that a hand may grasp both and squeeze this portion of rod 75 toward its respective horizontal portion of handle 63.

The vertical portion of rod 75 is provided with a coil spring 79 which at one end abuts leg 71a and at the other end is held in compression by pin 81 extending from rod 75. In this way coil spring 79 normally biases rod 75 into a stop position, i.e. the lower end of rod 75 extends into one of holes 65, thus, preventing rotation of handle 63. As a safety measure, to prevent inadvertent actuation of the mechanism, such as during transit, bracket 83 and safety pin 85 are provided. FIG. 5 shows the bracket-pin combination in unlocked position, while FIG. 1 shows it in locked position, i.e. where pin 85 extends across the end of bracket 83 to lock handle 63 in place. Pin 85 is conveniently held by chain 87 to prevent its loss.

In operation, wagon body 3 is loaded with grain or other particulate material. Wagon 1 is then coupled via mechanism 9 to a power driven vehicle (not shown) such as a conventional tractor or truck and towed to the grainary or other dispensing area. Prior to loading, one of holes 67 was designated as the "closed" hole and rods 43 are adjusted accordingly such that when pin 75 resides in the "closed" hole 67, plates 23 reside snugly against stops 29 thereby to tightly close orifices 17. This prevents loss of grain during transit.

To dispense the grain, pin 85 is removed. The horizontal portion of rod 75 is then pushed along slot 77 toward the horizontal portion of handle 63. This retracts the end of rod 75 from "closed" hole 67. If, however, rod 75 is released, it will automatically snap into hole 67 again due to the bias of coil spring 79.

With rod 75 retracted, handle 63 is rotated, thus, turning shaft 31 which in turn moves pivot connections 37 and plates 23. Because of the existence of plates 45 and the expansion cavity created thereby, plates 23 easily rotate to commence dispensing. The amount of flow is governed by the degree of rotation. The last hole 67 may be designated as "fully open" and all intermediate holes 67 thereto vary the actual flow to a degree less than full flow. Since plate 73 overlaps the inboard surface of the metering plate 57, the end of rod 75 is constantly maintained in hole engaging alignment with holes 67 during rotation of handle 63. Thus, with rotation of handle 63 and upon reaching the amount of flow desired, the horizontal portion of rod 75 is released, caused spring 79 to snap the lower end rod 75 into the hole 67 located at that point of rotation along surface 65. The handle 63 may then be released and the dispensing will continue until the compartment is empty. When body 3 is empty, the handle operation is repeated with reverse rotation until handle 63 is relocated in bracket 83, pin 85 returned to place and the end of rod 75 snapped into its "closed" hole 67.

Once given the above description, many other features, modifications and improvements will become apparent to the skilled artisan. Such other features, modifications and improvements are therefore considered a part of this invention, the scope of which is to be determined by the following claims:

I claim:

1. In a vehicle for hauling and dispensing a particulate material including body portion for holding said particulate material and a means of elevating said body portion above ground level, said body portion including a floor, walls extending upwardly from said floor, a dispensing orifice in said floor and a dispensing means located in said orifice for selectively opening and closing said orifice thereby to allow or prevent flow of said particulate material from said body portion, said dispensing means comprising a rotatable dispensing gate extending across said orifice, means for rotating said gate about a point intermediate its ends, one of said ends of said gate thereby being rotated upwardly and the other of said ends being rotated downwardly for selectively opening said orifice to allow dispensing of said particulate material from said body, the improvement comprising a concave plate member extending laterally across and above said upwardly rotated end of said gate, said concave plate member being spaced sufficiently above said end to allow said gate to rotate and of a size sufficient to form a cavity proximally above said upwardly rotated end of said gate which is sufficiently devoid of particulate material when said body is filled with said particulate material to allow sufficient upward rotation of said upwardly rotated end to initiate dispensing of said material through said orifice.

2. In a vehicle according to claim 1 wherein said concave plate member does not extend across or above any substantial portion of said downwardly rotated end of said gate.

3. In a vehicle according to claim 1 wherein said plate member is generally v-shaped, the apex of said "V" being further from said end than the base of said "V", said plate member being located sufficiently far above said end that when rotated said end will not contact the base of said "V".

4. In a vehicle according to claim 1 wherein said means for rotating said gate includes a shaft means extending laterally of said vehicle, handle means connected to said shaft, means for rotating said shaft, and means associated with said handle means for limiting the degree of rotation of said shaft.

5. In a vehicle according to claim 4 wherein said means for limiting the degree of rotation of said shaft comprises a surface spaced radially from said shaft and adjacent said handle, said surface being provided with a plurality of stop holes extending radially toward said shaft and spaced in line in the direction of movement of said handle means, a retractable pin associated with said handle means and capable upon movement of said handle means of being aligned with and inserted into said stop holes, biasing means for normally biasing said pin into a stop hole engaging position, and means for retracting said pin from said stop hole and against the normal bias of said biasing means, said retractable pin being associated with said handle means in such a way that when said pin is located in a stop hole said handle means can not be moved and said shaft cannot be rotated.

6. In a vehicle according to claim 5 wherein one of said stop holes defines a closed position for said gate when said pin resides therein and wherein another of said stop holes defines a fully opened position for said gate when said pin resides therein, and wherein there exists between said two stop holes, a plurality of further stop holes thereby to define a plurality of partially opened positions of said gate when said pin is located therein.

7. In a vehicle according to claim 6 wherein said biasing means is a coil spring located about a portion of said pin and supported at its lower end thereon by a retaining stud extending from said pin, the upper end of said spring being retained by a flange extending laterally from said handle means, said handle means extending radially from said shaft and terminating in a laterally extending first hand grasp means, said pin extending beyond the upper end of said coil spring adjacent said handle means and terminating in a laterally extending second hand grasp means in spaced relationship to said first hand grasp means such that said second hand grasp means can be squeezed toward said first hand grasp means against the normal bias of said coil spring thereby to retract said pin from a stop hole and allow movement of said handle and shaft.

8. In a vehicle according to claim 7 wherein there are a pair of orifices each orifice having a dispensing gate and shaft for rotating said gate, each shaft of the pair being connected to a common handle means and means for limiting the degree of rotation of said shafts.

9. In a vehicle according to claim 8 wherein there are at least two pairs of said orifices, each pair being controlled by a said common handle means, said common handle means being connected to each said pair by a rod means whose length is adjustable and which is located with respect to each of said gates such that adjustment of its length determines the tightness of closure of the orifice by said gates.

* * * * *